United States Patent [19]
Hempelmann et al.

[11] 3,790,128
[45] Feb. 5, 1974

[54] DEVICE FOR TRANSFERRING FLUIDS

[75] Inventors: Wilhelm Hempelmann, Leopoldshafen; Günter Waldenmeier, Karlsruhe; Manfred Kienhöfer, Leopoldshafen, all of Germany

[73] Assignee: Argus Gesellschaft mbH, Ettlingen/Baden, Germany

[22] Filed: Oct. 21, 1971

[21] Appl. No.: 191,364

[30] Foreign Application Priority Data
Mar. 4, 1971 Germany.............................. 2110320

[52] U.S. Cl............. 251/148, 137/614, 137/625.38, 137/614.11
[51] Int. Cl............................................ F16l 35/00
[58] Field of Search................. 251/148, 325, 149.9; 137/625.38, 625.48, 625.49, 614.04, 614, 614.01, 614.02, 614.03, 614.05, 614.06, 614.11–614.21

[56] References Cited
UNITED STATES PATENTS

| | | | |
|---|---|---|---|
| 2,078,402 | 4/1937 | McDonough et al. | 251/325 X |
| 2,694,413 | 11/1954 | Force | 251/325 X |
| 3,324,879 | 6/1967 | Bucknell et al. | 251/325 X |
| 2,709,566 | 5/1955 | Davis | 251/148 |
| 2,839,079 | 6/1958 | Holmes | 251/325 X |

FOREIGN PATENTS OR APPLICATIONS
352,205   3/1961   Switzerland................... 137/614.04

Primary Examiner—Samuel Scott
Assistant Examiner—Ira S. Lazarus
Attorney, Agent, or Firm—Hill, Sherman, Meroni, Gross & Simpson

[57] ABSTRACT

A device for transferring fluids, either in liquid or gaseous form, from one space to another comprises two hollow cylindrical valve bodies, each provided with a radial nipple serving as inlet and outlet respectively, and releasably connected with each other in axial alignment and containing each an axially movable piston releasably connected with each other by a thread on one end of a rod which projects axially from one end of one of said hollow cylindrical valve bodies and has a handle on the outwardly projecting end for manually pushing the combined pistons, which are provided with channels, from one end position in which the channels connect said two nipples with each other to another end position in which said channels are out of communication with said nipples.

8 Claims, 3 Drawing Figures

INVENTORS
Wilhelm Hempelmann, Günter Waldemeier
& Manfred Kienhöfer
BY
Hans W. Hefler
ATTORNEY

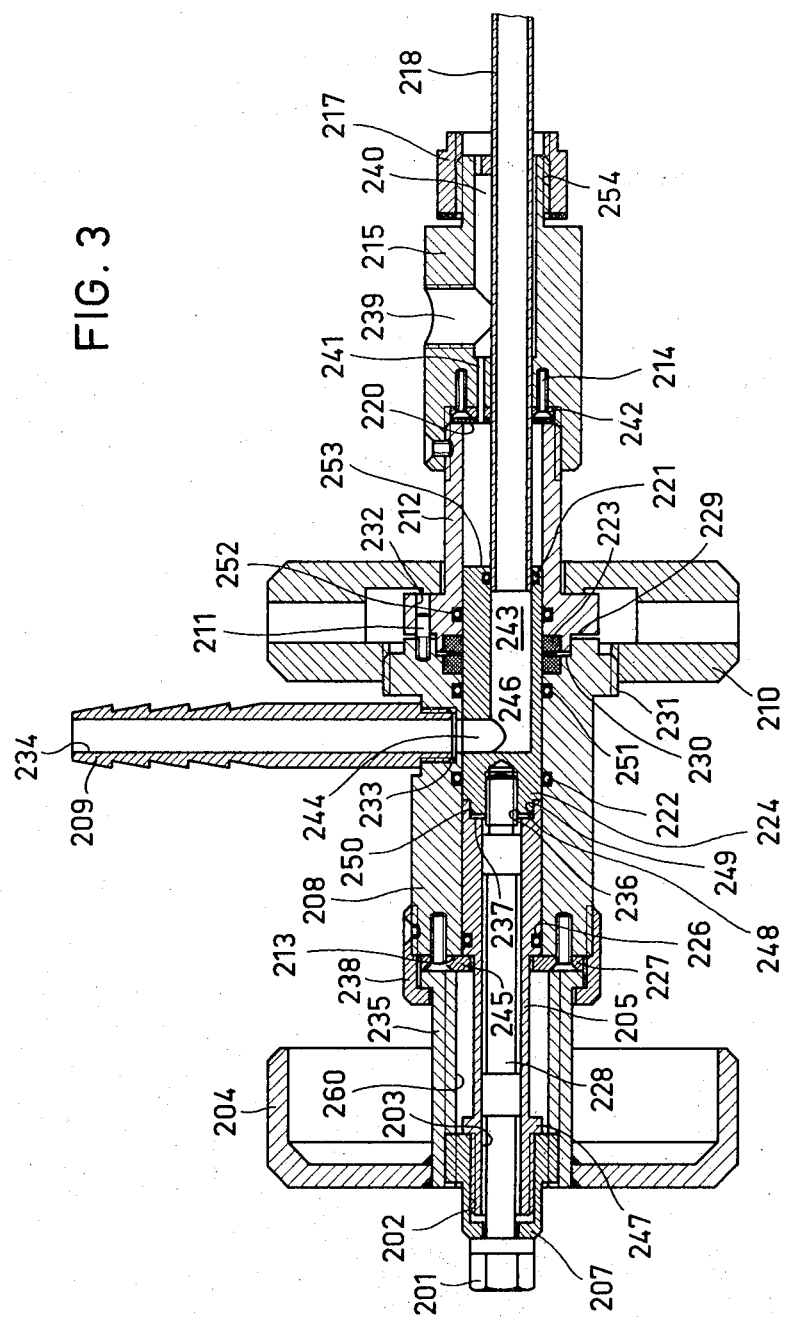

DEVICE FOR TRANSFERRING FLUIDS

The invention relates to a system for the transfer of material from one space into another one by means of valve bodies connected to said space and are connectable with each other. When these valve bodies are coupled together, their outer or separating surfaces will not be contaminated by the material transferred. In particular the invention pertains to a valve coupling for fluids for the transfer of contaminated liquids and/or gases.

The DT-AS 1 295 721 already describes a device which serves for conveying articles through the wall of a vessel in which reactions take place between radioactive materials. The device consists of a short cylindrical sleeve attached to the inlet port of the vessel, and of cup-shaped sleeves which receive the articles to be conveyed and may be pushed through the sleeve while the device remains closely sealed along the inner surface of the sleeve, whereby each cup moves the preceding one. This device assures a hazard free conveying of contaminated material from one space into another one; however, the cups can be used only once.

The DB GM 6 919 630 discloses a device designed as a rotary lock, which utilizes a rotor inside the thickness of a protective wall and has a transverse channel which depending on the position of the rotor establishes a connection between both sides of the wall transversely through the rotor or closes it.

The object of the invention is a separable transfer device of the above-mentioned type, particularly for the transfer of contaminated material in which the outer or separating surfaces, when separated after transfer, are free of any engagement with the material transferred. This is accomplished in a device of the above-mentioned type in such a manner that each valve body contains a first and a second closure member both movable longitudinally along the valve body axis. These closure members are movable together from a first end position, which corresponds to the separation and tight shut-off of both halves of the valve body, into a second end position. In the second end position a connecting channel is opened from one space into the other. Both halves of the valve body can be connected tightly with their surfaces which are exposed in the separated stage.

In one embodiment of the invention the closure members comprise cylindrical pistons, whereby a bore in the first piston of the first valve body leads from a first opening in the outer surface of the first piston to a second opening that is offset axially from the first opening. Further, in the first end position the first and second openings are sealed, radiation-proof from the atmosphere by gaskets of the first valve body, and in the second end position both openings are connected to at least one of a third and fourth opening each in the wall of the first and second valve body leading to one or the other space. One of the closure pistons may be axially movable by means of a rotary push rod, which is rotatably received by one of the closure pistons and is axially slidable.

Another embodiment of the invention features closure pistons of cylindrical shape with conical ends, in which the blunted end surfaces of the first closure piston is united with the end surface of the second piston by means of a rotary push rod in such a manner that both will form a combined closure member which in one end position separates fluid-tight the second spaces of the second valve body that are connected with the one closed space from the first spaces of the first valve body that are connected with the other space. In the other end position the combined closure member connects the first and second interior spaces.

An additional embodiment of the invention features a coaxial tube attached to a concentric bore in the rear of the closure piston of the first valve body. The bore forms a part of the flow channel inside the piston leading to the outer circumferential surface of the valve body. The tube enters more or less deeply into the concentric bore when the piston moves from one end position to the other end position and is in communication with the one space.

The devices of this invention have the advantage over the prior art that they may be used in open spaces and permit a contamination-free connection and disconnection, for instance, with transport bottles which are attached to a first valve body, or with boxes or other containers on which a second valve body is secured which together with the valve body associated with the bottle forms a transfer device. Since, as a rule, contaminated solutions have been transported heretofore in plastic containers which will be contaminated when transferred into decontamination boxes, the invention offers great economical advantage by offering a simple possibility for hazard-free transfer of such material without contamination of the transport container.

In the following are described additional special features and advantages of this invention with reference to the accompanying drawings showing various embodiments of devices for transferring particularly poisonous or contaminated substances, be it in liquid or gaseous form. All figures of the drawings illustrate axially sectional views as follows:

FIG. 3 shows a further embodiment with a flow channel featuring only one change of direction.

Figure 1:
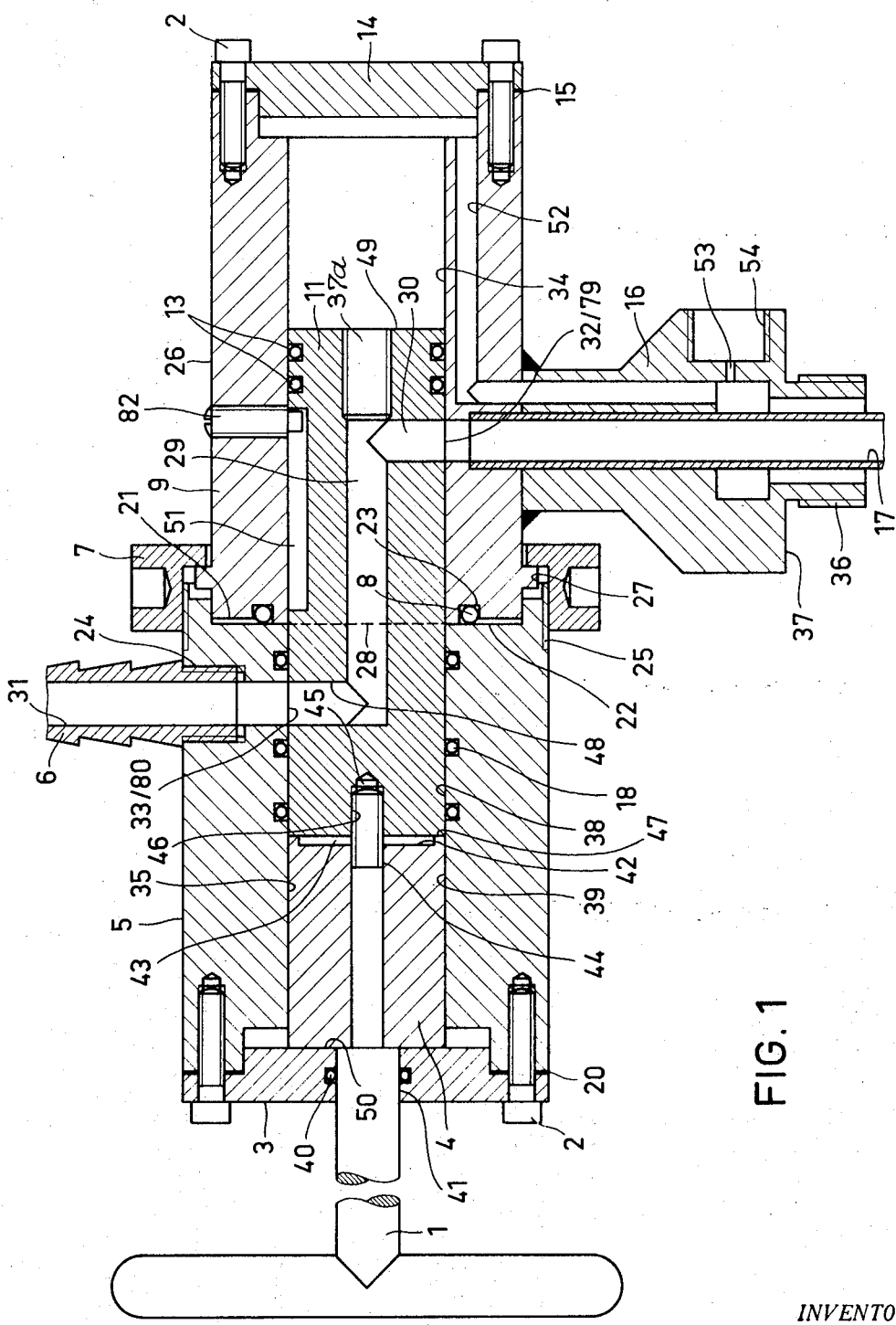
FIG. 1 shows a first embodiment with coupled valve bodies and closure pistons, the latter being in a position opening a flow channel through the device.

FIG. 1 illustrates an embodiment in which the valve bodies 5 and 9 comprise hollow cylindrical members which are connected by a box nut 7 which is threaded on an exterior thread 25 of the second valve body 5 and engages an outer collar 27 on the other valve body 9. Between the opposite plane surfaces 21 and 22 of the valve bodies one of the surfaces 22 has a circular groove 23 which has disposed therein an O-ring 8. At their ends opposed to the sealed joint indicated by a dash line 28 both valve bodies are closed by cover plates 3 and 14 respectively, and gaskets 15, 20 held in place by threaded bolts 2. Each valve body is provided with a radial nipple 6 and 16, respectively, and each nipple has an axial bore 31 and 17, respectively, which communicates with an opening 33 and 32, respectively, in the inner wall 35 and 34, respectively, of the valve bodies. The nipple 16 is equipped at its outer end with an exterior thread 36 for attaching the valve body 9 to a transport container for contaminated fluid, e.g. while the nipple 6 is constructed for the attachment to a hose.

Each valve body 5 and 9 has mounted therein a closure piston 4 and 11 which is slidable between the axially aligned cover plates 3 and 14. In the illustrated position both pistons are connected with each other by a rotary push rod 1 which is operated from outside of valve body 5. The rotary push rod 1 has an operating handle at its outer end and slides and rotates in a bore 41 in the cover plate 3 and is sealed therein by an O-ring 40 against the interior of the valve body 5. The rod 1 extends axially through the second piston 4 and has a thread 44 on its inner end which extends beyond the end face 42 of the piston 4 and is screwed into a threaded hole 45 in the piston 11, thus joining both pistons. In the joined condition of the pistons a ring-shaped area 47 which is formed by a recess 42 in piston 4 sealingly engages the plane surface 43 of the other piston, so that the end faces 42 and 43 and the hollow space formed between these end faces cannot be contaminated by the medium to be transferred.

The piston 11 is provided with an axial bore 29, the ends of which are in communication with two radial bores 30 and 48 perpendicular to the bore 29. The bores 30 and 48 are offset so that in the operative position shown their openings 79 and 80 coincide with openings 32, 33 in the circumferential walls of the valve bodies, whereas in the other end position of the pistons the openings 79 and 80 will be covered by the inner wall 34 of the valve body 9. The piston 11 is sealed within the valve body 5 by O-rings 18 arranged in circular grooves in the inner wall of the valve body on both sides of the opening 33 to prevent contamination of the areas 38 and 39 of the pistons as well as of the cavities between the piston faces 49 and 50 and the cover plates 3 and 14. Two more O-rings 13 are disposed in circular grooves in the surface 38 of the piston 11 between the opening 79 and the end face 49 of the piston 11.

In the separated condition of the valve bodies the pistons 4 and 11 are axially moved relative to the operative position shown in FIG. 1, so that the faces 42 and 43 are located in the contact plane indicated by the dash line 28. An axial keyway 51 in the surface 38 of the piston 11 and a radial threaded pin 82 in the wall of the valve body 9 sliding in the keyway 51 secures the piston 11 against rotation within the bore of the valve body 9 and also limits its axial displacement.

In the illustrated operative position, the pistons 4 and 11 are connected with each other and the bores 17 and 31 are in communication with another through the radial holes 30 and 48 and the axial hole 29 inside the piston 11, the end of which is closed by a plug 37a. Thus fluid can be transferred along the channel indicated. After completion of the transfer both pistons 4 and 11 are moved axially into the other end position by the rotary push rod 1. Air displaced by this axial movement from the cavity between end face 49 and the cover plate 14 escapes through a channel 52 inside the valve body 9 either into a discharge vessel connected to the nipple 16 or into the atmosphere through a lateral hole 53 and a filter (not shown) which can be screwed into a threaded hole 54 in the nipple 16. For venting the cavity between the end face 50 of the piston 4 and the cover plate 3 of valve body 5, similar channels are provided which however are not shown.

When the pistons 4 and 11 are thus moved axially into the other end position opposite the operative position shown, the rotary push rod is rotated until the threads 44 and 46 are separated. When then the box nut 7 is unscrewed from outer thread 25 on the valve body 5, the valve bodies 5 and 9 may be separated.

The connection of the two valve bodies 5 and 9 is accomplished in reverse sequence. The embodiment shown in FIG. 2 has also two valve bodies 105 and 109 connected by a box nut 107, and each valve body contains an axially movable piston 104 and 111, respectively. Between the end surfaces 121, 122 and 142, 143, respectively, of the pistons a circular groove 123 in one of the surfaces contains an O-ring 108. Both valve bodies, as distinguished from the embodiment of FIG. 1, are closed by walls 103 and 114 to which are bolted two axial support members 158, 159 of tubular shape.

A cylinder section 155 of the piston 104 extends through the wall 103 axially, is sealed off by an O-ring 140, and projects into the support member 158, the rear end of which is closed by a cover plate 162. Screwed on the reduced end of the cylinder section 155 opposite the piston 104 is an abutment disc 163 which tensions a spring 160 against the wall 103.

The piston 111 is also axially movable inside the valve body 109 and its cylinder section 157 extends through the wall 114 into the support member 159 and is sealed by O-rings 156, 167. The abutment disc 164 is threaded into the support member 159 and tensions the springs 161 against the end face of the cylinder section 157 inside the support member.

The pistons 104 and 111, as opposed to the embodiment shown in FIG. 1, have tapered ends 170 and 171 facing each other and forming a closure coupling with conical sealing faces. In the position shown in FIG. 2 they are urged toward each other in the tapered seats 173, 174 of the valve bodies by springs 160 and 161. the pistons are conntected to each other by a rotary push rod 101 which is rotatable and axially slidable in an axial bore 175 of the piston 111 and is screwed with its threaded end section 144 into a threaded hole 145 in the piston 104. The other end of the rod 101 projects from the support member 159. The rod 101 engages with a collar thereon the face of the cylinder section 157 opposite from the conical end 171.

Each valve body has a ring-shaped cavity 168, 169 enclosed by the conical seat 173 and 174, the end wall 103 and 114 and the corresponding cylinder section 155 and 157 of the pistons. Through an opening 133 and a bore 131 in a nipple 106 mounted on the valve body 104 a communication is established with the ring-shaped cavity 168, whereas a bore 117 in a nipple 116 mounted on valve body 109 establishes a communication with a ring-shaped cavity 169 through an opening 132.

Figure 2:
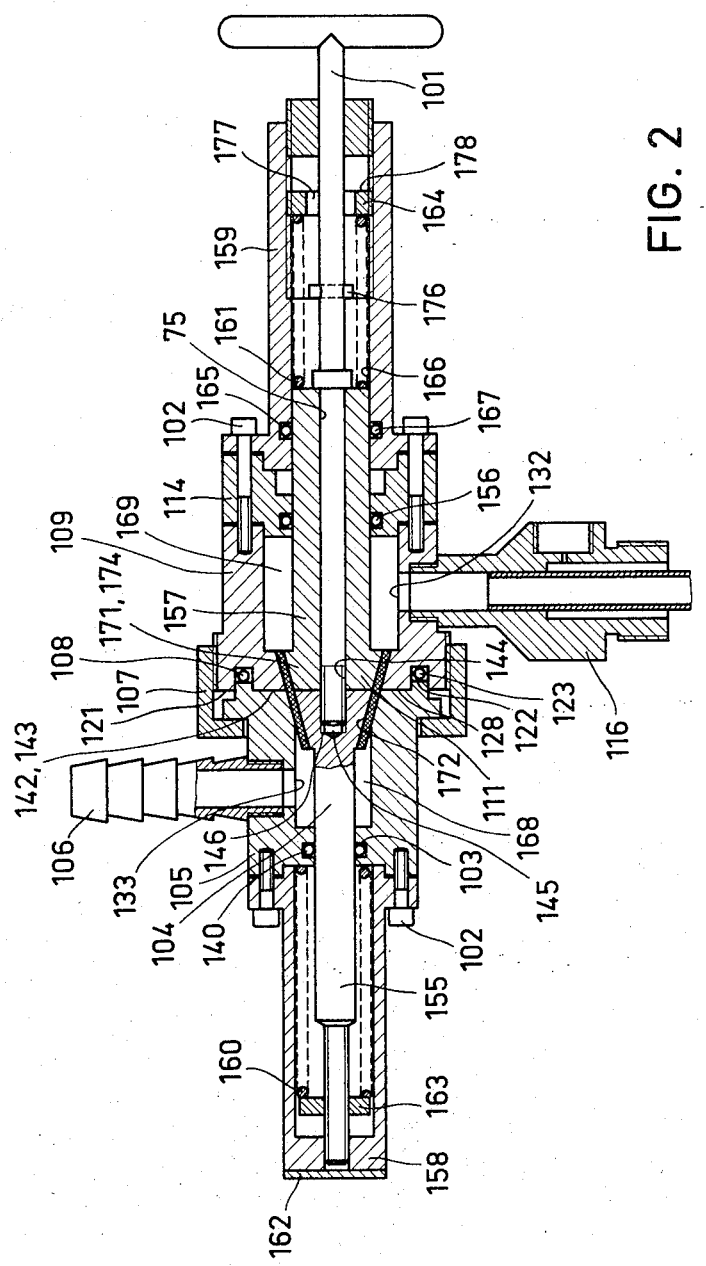
FIG. 2 shows a modified embodiment with closure pistons in a position closing off the flow channel.

In the position of the pistons shown in FIG. 2 the ring-shaped cavities 168 and 169 are separated from each other. To open a flow channel through the transfer assembly, the coupled pistons 104 and 111 have to be moved axially to the right (on the drawing), using the rotary push rod 101 to overcome the force of springs 160 and 161. For arresting the pistons in their axially displaced position serves a pin 176 extending transversely through rod 101 and movable through an opening 177 in the abutment disc 164 to lock on the rear side of the abutment disc after a slight turn of the rod 101.

When the flow channel is to be closed after finishing a transfer procedure, the ring-shaped cavities 168 and 169 have to be separated again. For this purpose the rod 101 is turned back slightly so that the pin 176 can slide back through the opening 177 in the abutment disc 164. The coupled pistons then return into their closure position shown in FIG. 2 due to the force of the springs 160 and 161. The separation of the pistons is accomplished, as described in conjunction with FIG. 1, by rotating the rod 101 to separate the threads 149 and 145. Then the valve bodies can be separated by unscrewing the box nut 107. Obviously, after separation in the plane 128 the exposed end faces of the valve bodies and of the pistons are free of any contamination.

In the embodiment of the invention shown in FIG. 3 the valve bodies 208 and 212 containing the axially movable pistons 205 and 224 are again connected with each other by a box nut 210. This box nut engages a ring collar on the valve body 212 and is threaded on the thread 231 of the valve body 208. The end faces 229 and 230 of the valve bodies containing ring seals 223 are pressed together. Guide pins 211 screwed into the face 230 extend into holes 232 in the face 229 and secure the valve bodies against relative turning. On the face of the valve body 208 directed away from the face 230 is mounted a support assembly 235 provided with a hand wheel 204 and attached to the valve body by a box nut 238 so it can be turned. This assembly is screwed onto the thread of the valve body 208 and engages a collar on the support assembly. The piston 205 is axially penetrated by a rotary push rod 228 and has a threaded extension projecting through the support assembly. A hat-shaped threaded sleeve 207 is screwed securely on the extension but it is screwed loosely and adjustably into an interior thread 260 of the support assembly. The rotary push rod 228 is connected to the sleeve 207 by a nut-type member 201. A guide sleeve 215 is screwed to the valve body 212, at the opposite end from the hand wheel 204, with a connector member 217 screwed with its thread at the opposite end from the handwheel. A pipe 218 extends eccentrically through the guide sleeve 215 inside the valve body. The end of the pipe 128 inside of valve body 212 is connected to an equally eccentric bore 243 in the piston 224, and is sealed by O-rings 221 against the interior of the valve body. The interior is further sealed by a closure plate 242 and a gasket 220 secured by bolts 214 to the guide sleeve 215. Vent holes 240, 241 extend through the guide sleeve 215 and also through the closure plate 242 and the gasket 220 connecting the interior of the valve body with a closed space which is connected with the pipe 218 and the atmosphere, respectively, through a filter system which can be attached to the lateral port 239.

The pistons 205 and 224 are connected with each other by screwing the threaded end 236 of the rod 228 into the threaded section 246 of the piston 224 with a sealed ring seat 250 on the piston 205 sealingly engaging a face on the piston 224. The sealing of the pistons from the atmosphere is achieved by O-rings 222, 226, 251, and 252 which are disposed in circular grooves in the guide bores of the valve bodies and the circumferential surface of the pistons, respectively.

In the illustrated operative position the pistons are in their end positions opening the flow channels, so that in the piston 224 an axial bore 243 and an adjoining radial bore 244 are connected with a bore 234 in a nipple 209 attached to the valve body 208 at 233. In this position a shoulder 213 on the piston 205 engages a closure wall 227 between the valve body 208 and a support assembly 235 which can be rotated in it. When the handwheel 204 is turned, the threaded sleeve 207 moves in the threaded section 260 of the support assembly 235 until a collar 247 on the piston 205 engages the closure plate 227, and the piston face 253 engages the closure plate 242, respectively. The piston faces 237 and 248 lie then in the dividing plane between the valve bodies. When turning the handwheel farther, then the thread tap 236 can be unscrewed from thread 246 after previously separating the two valve bodies by unscrewing the box nut 210. The end faces of the pistons are then, after separation, free of any contaminated areas by the arrangement of O-rings 251, 252, 223 and free of contamination by the fluid transferred.

The reconnection procedure for the valve bodies and the pistons takes places in reverse sequence.

What we claim is:

1. A disconnect coupling for transferring fluid between two containers which comprises a pair of housing members each having means for connection to a container, said housing members having free ends with mating end surfaces, means detachably coupling said housing members together with said end surfaces in tight abutting relation, said housing members having registering coaxial bores open to the free ends thereof, a separate piston slidable in each of said bores, each having an end face adapted to close the bores when the pistons are in a first position, said pistons being slidable to a second position, means defining a flow path joining the means for connection to the two containers when the pistons are in said second position, coupling means selectively locking the pistons together axially while in said first position with at least peripheral portions of the end faces of the pistons in abutting sealed relation, actuating means associated with said coupling for moving the pistons to said second position and actuatable only when said pistons are locked together, and said flow path being isolated from the surfaces of the free ends of the housing and the end faces of said pistons preventing contact of the fluid being transferred therewith, and movement of said pistons from the second position to the first position closing said flow path.

2. The coupling of claim 1 wherein the coupling means is effective to attach the two pistons together in end face to end face abutted relation with at least one of the pistons attached to the actuating means and said actuating means being effective to pull the one piston partially out of the bore of one housing member into the bore of the other housing member while moving the piston in the other housing member away from the free end of said other member within the bore of the other housing member while maintaining end face abutment of the pistons.

3. The coupling of claim 2 wherein one of said housing members has an outlet associated therethrough communicating to its bore and the other of said housing members has an inlet therethrough communicating to its bore, the one of said pistons having a flow path therethrough adapted to communicate the inlet to the outlet when the piston is in the second position.

4. The coupling of claim 2 wherein one of said housing members has an outlet therethrough communicating to the bore and the other of said housing members has an inlet therethrough communicating to the bore, the pistons having peripheral faces adjacent the end faces thereof closing the said bores adjacent the free ends of the housing members, the pistons having a diameter less than the diameter of portions of at least one bore, the pistons being movable to a second position within the one bore communicating the bores to one another around the peripheral faces of the pistons.

5. The coupling of claim 4 wherein the peripheral faces of the pistons are frustoconical.

6. The coupling of claim 1 in which the coupling means comprises a threaded end on an axially extending rod which extends through one of the pistons and which is threadable into a threaded opening in an end face of the other of said pistons to attach the rod to the other of said pistons and to draw the other of said pistons against the one of said pistons, the rod being axially movable to move the said pistons in unison from the one position to the second position, the rod having an enlargement remote from the threaded end, the enlargement urging the other piston against the one piston when the rod is threadably connected with the one piston.

7. The coupling of claim 1 in which the pistons comprise cylindrical pistons with frustoconical ends, one next to the other, the coupling means including a rotary and axially slidable rod which extends slidably through one of the pistons and is threadably connected with one of its ends to the other piston, with an enlargement remote from the threaded end of the rod urging the one piston in engagement with the other piston to form a continuous conical outer surface on said connected pistons, the housing pistons being provided each with the fluid's space between which is arranged a conical inner wall adapted to be engaged by such conical outer surface of the connected pistons so as to separate the two fluid spaces when the pistons are in the one position.

8. The coupling of claim 1 including spring means urging the pistons into the one position, the actuating means effective to overcome the urging of the spring to move the pistons to the second position.

* * * * *